United States Patent [19]
Suzuki

[11] Patent Number: 5,895,590
[45] Date of Patent: Apr. 20, 1999

[54] LUBRICATING OIL HEATER APPARATUS FOR AN ELECTRIC MOTORCAR

[75] Inventor: Tsutomu Suzuki, Wako, Japan

[73] Assignee: Honda Giken Kogyo Kabushiki Kaisha, Tokyo, Japan

[21] Appl. No.: 08/667,129

[22] Filed: Jun. 20, 1996

[30] Foreign Application Priority Data

Jun. 21, 1995  [JP]  Japan ............... 7-178159

[51] Int. Cl.$^6$ ..................................... B60L 1/02
[52] U.S. Cl. ............... 219/205; 219/202; 219/497
[58] Field of Search ..................... 219/202, 203, 219/205, 497, 505

[56] References Cited

U.S. PATENT DOCUMENTS

| | | | |
|---|---|---|---|
| 4,423,307 | 12/1983 | Kondo | 219/202 |
| 4,585,924 | 4/1986 | Pakula | 219/205 |
| 4,591,691 | 5/1986 | Bakali | 219/202 |
| 4,700,888 | 10/1987 | Samulak | 219/205 |
| 5,278,394 | 1/1994 | Morino | 219/497 |
| 5,354,965 | 10/1994 | Lee | 219/202 |

FOREIGN PATENT DOCUMENTS 6-29536  4/1994  Japan.

*Primary Examiner*—Teresa Walberg
*Assistant Examiner*—Vinod D. Patel
*Attorney, Agent, or Firm*—Nikaido, Marmelstein, Murray & Oram LLP

[57] ABSTRACT

A lubricating oil heater apparatus for an electric motorcar enabling an efficient running in viewpoint of electric power consumption. The electric motorcar is run by driving force of an electric motor transmitted to wheels through a power transmission and has a charge condition detecting device for detecting the charge condition of a battery when the battery can be charged, an oil temperature detecting device for detecting temperature of a lubricating oil in the power transmission, a heating device for heating the lubricating oil in the power transmission, and a heating control device for controlling operation of the heating device. The heating control device operates the heating device when the charge condition detecting device detects a predetermined charge condition and the oil temperature detecting device detects an oil temperature below a predetermined value.

5 Claims, 2 Drawing Sheets

LUBRICATING OIL HEATER APPARATUS FOR AN ELECTRIC MOTORCAR

BACKGROUND OF THE INVENTION

This invention relates to a lubricating oil heater apparatus of an electric motorcar for adjusting temperature of the lubricating oil supplied to power transmission means of the electric motorcar in order to attain a smooth driving.

Viscosity of lubricating oil in a lubricating system of a motorcar varies so as that it is high at lower temperature and becomes lower as the temperature rises.

When there is a heat source apt to be high temperature like an internal combustion engine, the lubricating oil is used also for cooling surroundings of the piston for example, and its temperature rises without a special apparatus so that the lubricating oil can get to a moderate viscosity and achieve a sufficient lubricating function.

However, in a very cold area, sometimes starting of the engine is difficult because viscosity of the lubricating oil has been increased on starting.

Therefore, there is an example that a sheath heater is provided on an internal combustion engine or a transmission (Japanese Patent Publication No. Hei 6-29536). In this example, the lubricating oil is previously heated to reduce the viscosity by connecting a lead line extended from the sheath heater to a commercial alternating current source before starting the engine, so that the engine can be started smoothly.

But in case of the electric motorcar, heat generation of the motor which is the drive source is less compared with the internal combustion engine and there is no other heat source so that when the atmospheric temperature is low, even in running, temperature of the lubricating oil is lowered to increase the viscosity by air cooling effect owing to the running. Therefore, the lubricating oil in a power transmission mechanism may act as a resistance on the contrary and the driving efficiency may be lowered.

On the one hand, since the electric motorcar runs by electric power of a battery, it is important to avoid, as possible, an electric power consumption other than that required for running, and when a heating means for heating the lubrication oil is provided, how to obtain the electric power for operating the heating means becomes a problem.

SUMMARY OF THE INVENTION

The present invention has been accomplished in view of the foregoing, and it is an object of the invention to provide a lubricating oil heater apparatus for an electric motorcar which enables a running efficient from a viewpoint of an electric power consumption by heating the lubricating oil to maintain a moderate viscosity avoiding the electric power consumption as possible.

In order to attain the above object, the present invention provides a lubricating oil heater apparatus for an electric motorcar having a power transmission means for transmitting driving force from an electric motor to rotatable wheels, comprising charge condition detecting means for detecting charge condition of a battery when the battery can be charged, oil temperature detecting means for detecting temperature of a lubricating oil in the power transmission means, heating means for heating the lubricating oil in the power transmission means and heating control means for controlling operation of the heating means when the charge condition detecting means detects a predetermined charge condition and the oil temperature detecting means detects an oil temperature below a predetermined value.

When a battery of a vehicle can be charged, it is possible for the vehicle to be supplied with electric power from a power supply source in exterior of the vehicle. Under such a condition capable of charging and when the charge condition detecting means detects a predetermined charge condition and the oil temperature detecting means detects an oil temperature below a predetermined value, the lubricating oil can be heated with the exterior electric power by operating the heating means to ensure a viscosity suitable for the lubrication and reduce a power loss of the power transmission means, while charging to the battery is carried out sufficiently.

Further, according to the present invention, there is provided a lubricating oil heater apparatus for an electric motorcar in which driving force of a motor is transmitted to wheels through a power transmission means for running, comprising driving condition detecting means for detecting a driving condition of the motorcar, oil temperature detecting means for detecting temperature of a lubricating oil in the power transmission means, heating means for heating the lubricating oil in the power transmission means and heating control means for controlling operation of the heating means. The heating control means operates the heating means when the driving condition detecting means detects a normal running condition and the oil temperature detecting means detects an oil temperature below a first predetermined value, as well as when the driving condition detecting means detects a traffic jam condition and the oil temperature detecting means detects an oil temperature below a second predetermined value lower than the first predetermined value.

If temperature of the lubricating oil lowers, the viscosity increases to increase power loss and therefore the heating means must be operated to raise the oil temperature. In connection with this, since vehicle power consumption rate on the traffic jam condition is larger compared with the rate on the normal running condition even if the running distances are the same, the oil temperature for operating the heating means is set, on the traffic jam condition, to the second predetermined value lower than the first predetermined value on the normal running condition for enabling a running more efficient from a viewpoint of the electric power consumption.

The lubricating oil heater apparatus of the present invention may be provided with battery remaining capacity detecting means for detecting remaining capacity of the battery, judgement means for judging whether the remaining capacity detected by the battery remaining capacity detecting means is below a set value or not, and heating operation prohibiting means for prohibiting operation of the heating means by the heating control means when the judgement means judges that the detected battery remaining capacity is below the set value. In this case, when the battery remaining capacity is low (below the set value), the operation of the heating means is prohibited by the heating operation prohibiting means and running is given priority over raising oil temperature in order to effectively use the battery remaining capacity.

Further, the lubricating oil heater apparatus may be provided with electric load operation condition detecting means for detecting operation condition of an electric load of the motorcar, and changing means for changing the set value of the judgement means in accordance with a condition of the electric load detected by the electric load operation condition detecting means. In this case, the set value of the battery remaining capacity for prohibiting operation of the heating means is changed in accordance with the operation condition of the electric load, namely, when an airconditioner or a headlight is operated for example, the set value of the battery remaining capacity for prohibiting operation of the heating means is set to a lower value. Thus, the remaining capacity of the battery can be utilized more effectively.

Manual control releasing means for releasing control operation of the heating control means manually may be provided. In this case, power consumption for raising oil temperature can be prohibited at driver's own will and useless power consumption can be prevented considering an expected use of the vehicle.

DETAILED DESCRIPTION OF THE PREFERRED EMBODIMENT

Figure 1:
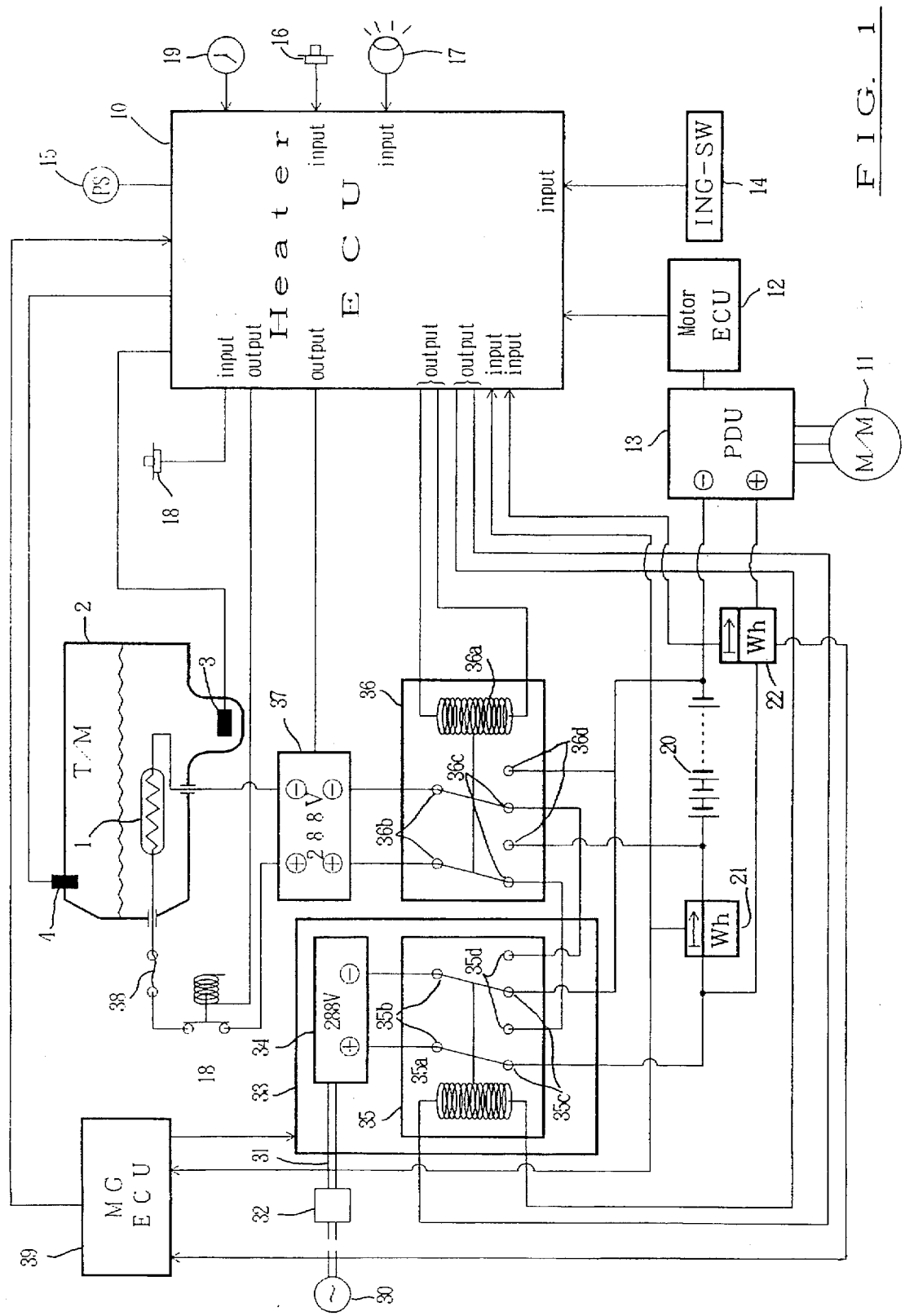
FIG. 1 is a block diagram of a control system for a heater according to an embodiment of the invention.
Figure 2:
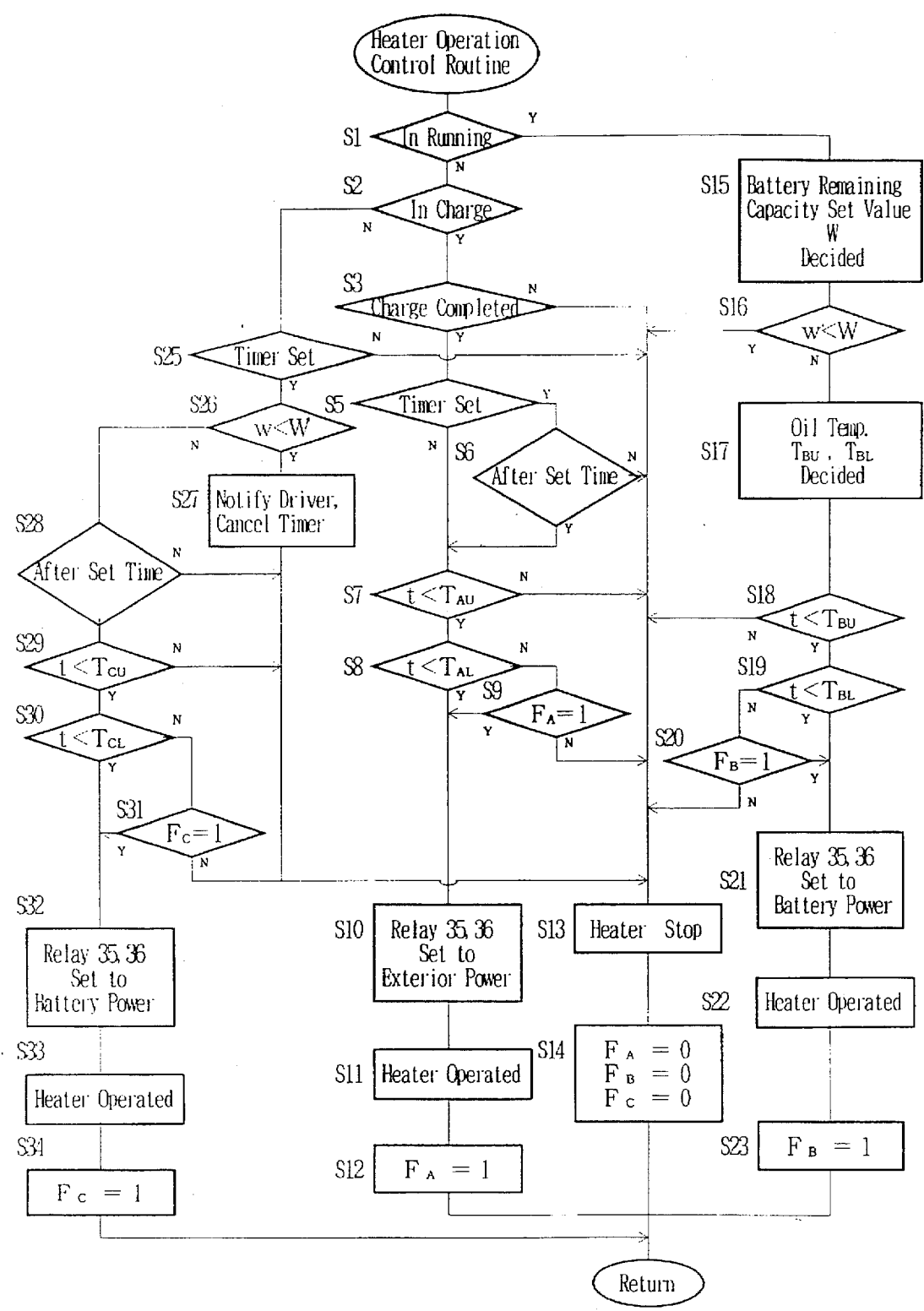
FIG. 2 is a flow chart showing a control process in the control system.

Referring now to FIGS. 1 and 2, one preferred embodiment of the present invention will be described.

An electric motorcar of the preferred embodiment has a heater 1 arranged in lubricating oil of a transmission 2 as a lubricating oil heating means. FIG. 1 is a block diagram of a control system for the heater 1.

The heater 1 is one of a ceramic series electric heating type having a self-controlling nature in which amount of heat generation varies in accordance with temperature. The heater 1 is provided in a bottom portion of the transmission 2 together with a drain bolt, a level gauge or the like immersed in the lubricating oil. Namely, the heater 1 is placed in the lubricating oil at a position apt to be most influenced by increased viscosity of the lubricating oil.

An oil temperature sensor 3 is arranged in the lubricating oil of the transmission 2 and a car speed sensor 4 for detecting the car speed is provided in the transmission.

The heater 1 is controlled by a heater ECU 10. To the heater ECU 10 are inputted oil temperature detection signal of the oil temperature sensor 3 and car speed detection signal of the car speed sensor 4 as well as motor condition signal from a motor ECU 12 controlling a motor 11 for running, on-off signal from an ignition switch 14, shift position detection signal from a position sensor 15, on-off signal of an airconditioner, on-off signal of a headlight 17, on-off signal of a cancel switch 18 which can be operated manually and clock signal of a timer 19.

On a + (positive) charge line of a battery 20 for driving the motor 11 is provided a charge sensor 21 for detecting the charge condition which is a watt-hour meter and on a + discharge line of the battery 20 is provided a discharge sensor 22 for detecting the discharge condition which is also a watt-hour meter. The detection signals of the charge sensor 21 and the discharge sensor 22 are also inputted to the heater ECU 10.

Electric power of the battery 20 is inputted to a motor driving unit 13 which drives the motor 11 based on control signals from the motor ECU 12 to run the electric motorcar.

A lead line 31 for obtaining power from an exterior electric source 30 is extended from an on-board charger 33. A plug 32 on a chip end of the lead line 31 is connected to a power-outlet socket of the exterior electric source 30 for domestic use to be supplied power.

The on-board charger 33 comprises a rectifier 34 converting an alternating current of the exterior power source 30 into a direct current of a predetermined voltage and a charge control relay 35 having a relay coil 35a. Excitation of the relay coil 35a is controlled by the heater ECU 10.

Further, a heater source switchover relay 36 is provided and excitation of a relay coil 36a of the heater source switchover relay 36 is also controlled by the heater ECU 10.

In the charge control relay 35, relay switchover contacts 35b connected to output terminals of the rectifier 34 are selectively connected to either relay contacts 35c connected to input and output terminals of the battery 20 or relay contacts 35d connected to relay contacts 36c of the heater source switchover relay 36.

In the heater source switchover relay 36, relay switchover contacts 36b connected to input terminals of a heater driver 37 are selectively connected to either relay contacts 36c connected to the relay contacts 35d of the charge control relay 35 or relay contacts 36d connected to input and output terminals of the battery 20.

The heater driver 37 controls amount of electricity supplied to the heater 1 by chopper control in accordance with control signal from the heater ECU 10 and a + output terminal of the heater driver 37 is connected to one contact of the cancel switch 18 and a − output terminal is connected to one end of the heater 1. The other contact of the cancel switch 18 is connected to another end of the heater 18 through a fuse 38.

When the cancel switch is operated to be "ON", the contacts open to prohibit power supply to the heater 1. The power can be supplied to the heater 1 when the cancel switch is in "OFF" state. Amount of electricity supplied to the heater 1 is controlled by the heater ECU 10 so as to be larger as the oil temperature is lower.

Detection signals of the charge sensor 21 and the discharge sensor 22 are inputted to a management ECU 39 which calculates remaining capacity of the battery 20 and the like and outputs the result to the heater ECU 10.

According to relay connecting states of the charge control relay 35 and the heater source switchover relay 36, there can be set three modes, that is, a charge mode to the battery 20, a heater operation mode by the exterior source and a heater operation mode by the battery.

FIG. 1 shows the charge mode. The relay switchover contacts 35b of the charge control relay 35 are connected to the relay contacts 35c so that the output of the rectifier 34 is connected to the input and output terminals of the battery 20, while the relay switchover contacts 36b the heater source switchover relay 36 is connected to the relay contacts 36c to be left in open state.

If the charge control relay 35 is switched over from the state of FIG. 1, the heater operation mode by the exterior electric source 30 is brought about. The relay switchover contacts 35b are connected to the relay contacts 35d to be connected to the relay contacts 36c of the heater source switchover relay 36 so that electric power of the exterior source 30 can be led to the heater driver 37 through the rectifier 34. In this relay connecting state, it is also possible to drive the motor 11 by the battery 20 with the exterior electric source 30 removed.

A control process in the above-mentioned heater control system will be described with reference to FIG. 2.

At first, whether the vehicle is running or not is decided based on signals of the ignition switch 14 and the position sensor 15 (Step 1). When the vehicle is parked or stopped, the ignition switch 14 is "off" and the position sensor 15 detects that the shift lever is positioned in the parking or neutral position and in this case the flow advances to Step 2. Otherwise when the vehicle is running, the flow jumps to Step 15.

In the step 2, whether in charging or not is discriminated. For example, in case that the charge is carried out at night when the vehicle is not run normally, with the plug 32 connected to the power-outlet socket of the exterior electric source 30 for domestic use and the relays 35, 36 are in the charge mode, whether in charge or not can be discriminated by watt-hour signal of the charge sensor 21. If it is in charge, the flow advances to Step 3 to discriminate whether the charge is completed or not, and when the charge has been completed or the charge is impossible because the exterior electric source is not connected, the flow advances to Step 25.

The remaining capacity of the battery 20 is calculated based on respective watt-hour signals of the charge sensor 21 and the discharge sensor 22 by the management ECU 39 and whether the charge has been completed or it is in full charge condition can be discriminated from the result.

When it is discriminated that the charge has not been completed on Step 3, the flow jumps to Step 13 to bring the heater 1 in the stopped condition and then flags $F_A$, $F_B$, $F_C$ are set to "0" at Step 14.

When the charge is completed, the flow advances from Step 3 to Step 5. In Step 5, whether the timer 19 is set or not is discriminated, and when the timer is not set the flow advances to Step 7 directly, when the timer is set the flow advances to Step 6 for discriminating whether the set time is reached or not. As long as the set time is not reached, the flow jumps to Step 13 and the heater 1 is not operated. The flow advances to step 7 after the set time.

Accordingly, if a time when the motorcar is used for running after charging the battery 20 is prearranged, the timer may be set to a time ahead of the prearranged time by a predetermined time interval. By doing so, ever if the charge of the battery 20 is completed, the heater 1 does not operate until the set time of the timer 19 is reached so that a useless power consumption by early operation of the heater 1 can be avoided. After that, the heater is operated at the set time and it is possible to start the running when lubricating oil is heated to a moderate temperature.

At Step 7, whether the oil temperature t is lower than a predetermined temperature $T_{AU}$ or not is discriminated. And when the temperature t is higher than $T_{AU}$, the flow jump to Step 13 to stop operation of the heater 1 because the oil temperature is sufficient. When the temperature t is lower than $T_{AU}$ the flow advances to Step 8. At step 8, whether the oil temperature is lower than a predetermined further lower temperature $T_{AL}$ ($<T_{AU}$) or not is discriminated. When the temperature t is lower than $T_{AL}$, the flow advances to Step 10. When the temperature t is higher than $T_{AL}$, advances to Step 9 and whether the flag $F_A$ is "1" or not is discriminated. When $F_A$ is not "1", jumps to Step 13 and when Fa is "1", advances to Step 10.

At Step 10, the charge control relay 35 is switched over to the condition enabling operation of the heater by the exterior electric source 30 and the heater 1 is operated by the exterior electric source 30 to heat the lubricating oil at Step 11. At that time, an amount of electricity corresponding to the oil temperature is supplied to the heater 1 by the heater driver 37 to control the heating. Next, the flag $F_A$ is set to "1" at Step 12.

Therefore, when the oil temperature t is lower than the temperature $T_{AL}$, the flow advances to Step 10 from Step 8 and the heater 1 is operated to raise the oil temperature.

When the oil temperature t is higher than the temperature $T_{AL}$ but lower than the temperature $T_{AU}$, the flow advances to Step 9 from Step 8 and again returns to Step 10, because the flag $F_A$ is "1", to continue operation of the heater 1. When the oil temperature t exceeds the temperature $T_{AU}$, for the first time the flow jumps to Step 13 from Step 7 and operation of the heater 1 is stopped to constitute a hysteresis.

As described above, in the charge mode, when the oil temperature t after completion of charge is lower than the predetermined temperature $T_{AL}$, the heater 1 is operated by the exterior electric source 30, so that the lubricating oil is heated to prevent loss of transmitted power owing to lowered viscosity while power of the battery 20 is maintained. Even in a cold morning, the motorcar can be started smoothly and also during it is running, the running resistance can be reduced.

In case that the timer is set in accordance with a running expected time, operation of the heater can be started at a set time after completion of charge so as to have a moderate oil temperature when the motorcar runs and prevent useless consumption of the power. On the one hand, when it is discriminated that the car is in running at Step 1, the flow advances to Step 15 and a set value W which is a criterion for judgement of remaining capacity of the battery 20 is decided from the electric load operation condition. The set value W is compared with an actual battery remaining capacity w at Step 16, when the actual battery remaining capacity w is smaller than the set value W the flow jumps from Step 16 to Step 13 where the heater is not operated, and when the former is larger than the latter, advances to Step 17.

Namely, when the airconditioner 16, the headlight 17 and the like are used and electric load is large, a large set value W is decided, in order to give a larger priority to vehicle running over oil temperature raising by operation of the heater 1 and use the battery remaining capacity W effectively.

When the actual battery remaining capacity w is larger than the set value W and there is a margin, the flow advances to Step 17 and predetermined oil temperature $T_{BU}$, $T_{BL}$ are decided according to the running conditions. There are two running conditions, normal running and traffic jam running, and they are discriminated by a mean velocity in a specific time duration. The predetermined oil temperatures $T_{BU}$, $T_{BL}$ on the traffic jam running condition are lower than those on the normal running condition.

At the next Step 18, whether the oil temperature t is lower than the predetermined temperature $T_B$ or not is discriminated, and when the oil temperature t is higher than the temperature $T_B$, it is judged that the oil temperature is sufficient and the flow jumps to Step 13 where the heater 1 not operated. When the oil temperature t is lower than the temperature $T_B$, the flow advances to Step 19 and whether the oil temperature t is lower than the predetermined further low temperature $T_{BL}$ ($<T_B$) or not is discriminated. The flow advances to Step 21 when the oil temperature t is lower, and advances to Step 20 when the temperature t is higher. At Step 20, whether the flag $F_B$ is "1" or not is discriminated. When the flag $F_B$ is not "1", the flow advances to Step 13 when it is "1", advances to Step 21.

At Step 21, the heater source switchover relay 36 is switched over to the heater operation mode by the battery, and at Step 22, the heater 1 is operated by the battery 20 to heat the lubricating oil.

At this time, an amount of electricity corresponding to the oil temperature is supplied to the heater 1 by the heater driver 37, but the amount of electricity to be supplied to the heater 1 is controlled to a somewhat lower value on running compared with on parking or stoppage, because a slight rise of the oil temperature can be expected on running by the fact that the lubricating oil is stirred by inner parts. Next, the flag $F_B$ is set to "1" at Step 23.

Namely, when the oil temperature t is lower than the temperature $T_{BL}$, the flow advances to Step 21 from step 19 and the heater 1 is operated to raise the oil temperature. When the oil temperature t is higher than the temperature $T_{BL}$ but lower than the temperature $T_B$, the flow advances to Step 20 from Step 19 and again returns to Step 21, because the flag $F_B$ is "1", to continue operation of the heater 1. When the oil temperature t exceeds the temperature $T_B$, for the first time the flow jumps to Step 13 from Step 18 and operation of the heater 1 is stopped to constitute a hysteresis.

On the traffic jam running, the predetermined temperatures $T_{BU}$, $T_{BL}$ are set to lower values than those on the normal running, therefor the heater 1 is not operated to heat the lubricating oil unless the oil temperature becomes lower compared with the case of the normal running, and even if the heater 1 is operated once and the oil temperature is raised, the operation of the heater 1 is stopped at a lower oil temperature compared with the case of the normal running.

As described above, on the traffic jam running, operation of the heater 1 is limited in order that consumption of the battery power is restrained so as to be used for running as possible, a sufficient running distance per one change is ensured and a efficient running from viewpoint of power consumption is possible.

According to a heater operation control of the present invention, even in case that the car is parked at a place where power from an exterior electric source is not available, operation of the heater is possible if the battery has enough remaining capacity.

Namely, when it is not in running nor in charging, the flow advances to Step 25 from Step 2 and whether the timer is set or not is discriminated. When the timer is not set, the flow jumps to Step 13 and the heater is not operated. Only when the timer is set, the flow advances to Step 26 and the heater can be operated by electric power of the battery.

At Step 26, whether the battery remaining amount w is lower than a set value W' or not is discriminated. When w is lower than W', the flow advances to Step 27 where the effect is notified the driver by means of a lamp, buzzer or the like and the timer is canceled, and the battery power is not used for the heater operation. The set value W' which is the criterion for this discrimination is somewhat larger than the set value W at Step 15 because the car is stopped now.

When the battery remaining amount w is larger than the set value W' at Step 26, the flow advances to Step 28 and whether the set time of the timer is reached or not is discriminated. As long as the set time is not reached, the flow jumps to Step 13 and the heater 1 is not operated. After the set timed is reached, the flow advances to Step 29.

Namely, if a time when the motorcar is used for running is prearranged, the timer may be set to a time ahead of the prearranged time by a predetermined time interval. In this case, the heater 1 does not operate until the set time of the timer 19 is reached so that a useless power consumption by early operation of the heater 1 can be avoided. After that, the heater is operated at the set time and it is possible to start the running when the lubricating oil is heated to a moderate temperature.

At Step 29, whether the oil temperature t is lower than a predetermined temperature $T_{CU}$ or not is discriminated. When the oil temperature t is higher than the temperature $T_{CU}$, it is judged that the oil temperature is enough, the flow jumps to Step 13 and the heater is not operated. When the oil temperature t is lower than the temperature $T_{CU}$ the flow advances to Step 30 and whether the oil temperature t is lower than a further low predetermined temperature $T_{CL}$ ($<T_{CU}$) or not is discriminated. Then the flow advances to Step 32 if t is lower than $T_{CL}$ or jumps to Step 31 if t is higher than $T_{CL}$. At Step 31, whether the flag $F_C$ is "1" or not is discriminated and then the flow jumps to Step 13 if the flag $F_C$ is not "1" or advances to Step 32 if the flag $F_C$ is "1". The temperature $T_{CU}$ is higher than the aforementioned temperature $T_{AU}$ and the temperature $T_{CL}$ is higher than the aforementioned temperature $T_{AL}$.

At Step 32, the charge control relay is switched over to the condition enabling operation of the heater by the battery 20, and at step 33, the heater is operated by the battery 20 to heat the lubricating oil. At this time, an amount of electricity corresponding to the oil temperature is supplied to the heater 1 by the heater driver 37 to control the heating. Then the flag $F_C$ is set to "1" at Step 34.

Namely, when the oil temperature t is lower than the temperature $T_{CL}$, the flow advances to Step 32 from Step 30 and the heater 1 is operated to raise the oil temperature. When the oil temperature t is higher than the temperature $T_{CL}$ but lower than the temperature $T_{CU}$, the flow advances to Step 31 from Step 30 and again returns to Step 32, because the flag $F_C$ is "1", to continue operation of the heater 1. When the oil temperature t exceeds the temperature $T_{CU}$, for the first time the flow jumps to Step 13 from Step 29 and operation of the heater 1 is stopped to constitute a hysteresis.

Therefore, in case that the car is stopped at a place where an exterior electric source is not available, and the oil temperature t is lower than the predetermined temperature $T_{CL}$, if the battery remaining amount w is larger than the set value W' and the timer is set, the heater 1 can be operated by the battery 20. Thus, the lubricating oil is heated to lower the viscosity and prevent loss of transmitted power, and even in a cold morning the motorcar can be stated smoothly.

The timer is set according to an expected time for running and the heater is operated when the set time is reached, so that a moderate oil temperature is attainable on running and the battery power is not consumed uselessly.

As the foregoing, when the cancel switch 18 is switched on manually, the electric current to the heater 1 is intercepted and operation of the heater can be prohibited forcibly. Therefore, the heater 1 can be used selectively according to the driver's intention.

Usually, the heater 1 operates automatically when the oil temperature has dropped below the predetermined temperature $T_{AL}$ after the charge if the time is not set or after the set time if the timer is set and the electric power is consumed uselessly in some cases. If the cancel switch 18 is switched on, the above situation can be avoided.

What is claimed is:

1. A lubricating oil heater apparatus for an electric motorcar having a power transmission means for transmitting driving force from an electric motor to rotatable wheels, said electric motor being operated by power from a battery which can be charged, comprising:

an amount of charge detecting means for detecting the amount of charge condition of said battery to determine when said battery can be charged;

oil temperature detecting means for detecting the temperature of a lubricating oil in said power transmission means;

heating means operated by power from said battery for heating said lubricating oil in said power transmission means; and heating control means for controlling operation of said heating means which operates said heating means when said amount of charge detecting means detects a predetermined charge condition and said oil temperature detecting means detects an oil temperature below a predetermined value.

2. A lubricating oil heater apparatus for an electric motorcar in which driving force of an electric motor is transmitted to wheels through a power transmission means for running, said electric motor being operated by power from a battery which can be charged, comprising:

driving condition detecting means for detecting a driving condition of said motorcar;

oil temperature detecting means for detecting the temperature of a lubricating oil in said power transmission means;

heating means operated by power from said battery for heating said lubricating oil in said power transmission means; and heating control means for controlling operation of said heating means which operates said heating means when said driving condition detecting means detects a normal running condition and said oil temperature detecting means detects an oil temperature below a first predetermined value, as well as when said driving condition detecting means detects a traffic jam condition and said oil temperature detecting means detects an oil temperature below a second predetermined value lower than said first predetermined value.

3. A lubricating oil heater apparatus for an electric motorcar as claimed in claim 2, comprising:

battery remaining capacity detecting means for detecting remaining capacity of a battery;

Judgement means for judging whether said remaining capacity detected by said battery remaining capacity detecting means is below a set value; and heating operation prohibiting means for prohibiting operation of said heating means by said heating control means when said judgement means judges that the detected battery remaining capacity is below a set value.

4. A lubricating oil heater apparatus for an electric motorcar as claimed in claim 3, comprising:

electric load operation condition detecting means for detecting operation condition of an electric load of said motorcar; and changing means for changing the set value of said judgement means in accordance with a condition of said electric load detected by said electric load operation condition detecting means.

5. A lubricating oil heater apparatus for an electric motorcar as claimed in any one of claims 1, 2, 3 and 4, comprising manual control releasing means for releasing control operation of said heating control means manually.

* * * * *